(12) United States Patent  (10) Patent No.: US 7,748,936 B2
Schneider et al.  (45) Date of Patent: Jul. 6, 2010

(54) BRACING ARRANGEMENT WITH OVERLOAD PROTECTION

(75) Inventors: Norbert Schneider, Uznach (CH); Gerhard Ploke, Rüeterswil (CH)

(73) Assignee: P & S Vorspannsysteme AG, St. Gallenkappel (CH)

( * ) Notice: Subject to any disclaimer, the term of this patent is extended or adjusted under 35 U.S.C. 154(b) by 355 days.

(21) Appl. No.: 10/549,651

(22) PCT Filed: Mar. 18, 2004

(86) PCT No.: PCT/EP2004/002854

§ 371 (c)(1), (2), (4) Date: Jan. 8, 2007

(87) PCT Pub. No.: WO2004/083655

PCT Pub. Date: Sep. 30, 2004

(65) Prior Publication Data

US 2007/0170342 A1   Jul. 26, 2007

(30) Foreign Application Priority Data

Mar. 18, 2003  (DE) ................................ 103 12 011

(51) Int. Cl.
*F16B 31/00* (2006.01)
(52) U.S. Cl. ................ 411/5; 411/8; 411/367
(58) Field of Classification Search ........ 411/5, 411/8, 14.5
See application file for complete search history.

(56) References Cited

U.S. PATENT DOCUMENTS

| 3,041,913 | A | * | 7/1962 | Liska ........................ 411/87 |
| 3,659,877 | A | | 5/1972 | Kubasta |
| 5,328,312 | A | * | 7/1994 | Driscoll ........................ 403/11 |
| 5,690,456 | A | * | 11/1997 | Wedellsborg ................ 411/383 |
| 5,772,378 | A | | 6/1998 | Keto-Tokoi |
| 7,121,780 | B2 | * | 10/2006 | Matich et al. ................ 411/367 |

FOREIGN PATENT DOCUMENTS

DE   704 518   4/1941

* cited by examiner

*Primary Examiner*—Gary Estremsky
(74) *Attorney, Agent, or Firm*—Knobbe Martens Olson & Bear LLP

(57) ABSTRACT

A clamping device with overload protection and a process to connect both elements, which are to be connected, whereby the clamping device is fitted with an element to be connected first, an element to be connected second, which is connected to the first element, and a bracing bolt to connect. In order to ensure effective overload protection, the clamping device contains a sleeve, which is connected with the second element to be connected through the bracing bolt, and which runs through the first element to be connected, and a sleeve tensioning device, which is engaged with the sleeve, and which clamps the first element to be connected with the second element to be connected, whereby the bracing bolt is stretched to a predetermined stress level in relation to its elastic limit, whereby the sleeve is released of tension up to a predetermined release level, and a transgression of the operating force, which separates the two elements to be connected, leads—beyond an operating force limit—to a stress release of the sleeve relative to the clamping, by the bracing bolt, and to a breaking of the bracing bolt.

6 Claims, 2 Drawing Sheets

BRACING ARRANGEMENT WITH OVERLOAD PROTECTION

BACKGROUND

1. Field

The invention refers to a bracing arrangement with overload protection.

2. Related Art

The bracing of two parts to be braced, e.g. a bar and beam, with the help of a threaded connection is generally known. Such connections are problematic, when the two parts to be braced, e.g., a frame and a beam, constitute a press arrangement, which are overloaded in case of a malfunction of the press during a force that drives apart the two elements to be clamped, which then leads to a deformation of these elements to be clamped or of other elements of the press arrangement.

Commonly known are power sensors in hydraulic pipes, which record a too large an increase in the compression ratios in hydraulic pipes for the operation of a press arrangement, so that an emergency stop is triggered off in such a case. However, such hydraulic control systems are too sluggish to record a rapid increase in force in time, as may, for instance, in case of a malfunction, occur while using ceramic and metal powder presses.

SUMMARY

The task of the invention consists in proposing an improved overload protection for a threaded connection of two elements to be screwed to each other.

This task is resolved in one embodiment with a bracing arrangement with overload protection comprising a first element to be braced, a second element to be braced against the first element and a bracing bolt bracing the first and second elements, a sleeve, which is braced against the second element to be braced-with the bracing bolt and which goes through the first element to be braced, and a sleeve tensioning device, which engages the sleeve and braces the first element to be braced against the second element to be braced, whereby the sleeve is released to a pre-specified extent by means of the sleeve tensioning device and whereby exceeding the operating force that separates the first and second elements from each other beyond an operating force threshold leads to relaxation of the sleeve relative to the bracing by the bracing bolt—and to the consequential breaking of the bracing bolt.

In another embodiment, a method for bracing at least two elements to be braced with the help of a bracing bolt, a sleeve and a sleeve tensioning device comprises bracing the sleeve by means of the bracing bolt against the second element to be braced, whereby the bracing bolt compresses the sleeve, bracing the first element to be braced on the second element to be braced with the sleeve tensioning device, whereby the sleeve tensioning device is braced with engagement with the sleeve projecting through the first element to be braced, in such a manner that the sleeve is relaxed relative to the preceding compression up to a pre-specified extent of release, wherein an operating force, which moves the first and the second elements to be braced in mutually opposite directions, leads, above a pre-specified threshold value, to a complete release of the sleeve and to the breaking of the bracing bolt.

In normal operation, the power flow and/or working load goes effectively only though the sleeve, the sleeve clamping device and the two elements to be clamped. In case of overload, the power flows effectively only though the bracing bolt and the two elements to be clamped and then leads to the breaking of the bracing bolt, so that other machine elements are not damaged and expensive repairs can be avoided. The difference in the clamping forces of the bracing bolt and the sleeve clamping device determines the load alleviation on the sleeve and/or the opening limit of the sleeve. The breaking load can thus be further set irrespective of the material values.

For the bracing arrangement and/or procedure for clamping two elements to be clamped, a sleeve is utilized, prestressed with respect to that with element to be braced against the second, using the pulling bolt, in view of the rigidity and/or the elasticity of the bracing bolt, wherein the prestressed sleeve is released of tension, except for a residue, for clamping the two elements to be clamped with the help of the sleeve clamping device. Bracing bolts also refer to any similarly working element. The same applies to the sleeve, wherein both the bracing bolt and the sleeve are not limited to components with circular or cylindrical cross sections, in particular. Even oval, rectangular and square cross sections can be used according to other embodiment variants.

Screw threads are preferred for clamping, however, any other clamping device can also be used, e.g., lock washers and snap rings of frictionally engaged connections. In view of the clamping in the clamping state, the bracing bolt can be used advantageously up to a given degree of stress at its apparent limit of elasticity, wherein the degree of stress can be appropriately selected depending on the tolerance required for the corresponding intended use. The same applies to the given degree of load alleviation, up to which the sleeve is released from tension with the help of the sleeve clamping device. Ideally, the degree of stress and the degree of load alleviation are matched with each other. The operating force limit is finally determined on the basis of the ratio of the degree of stress and the degree of load alleviation and, in particular, based on the elasticity ratios of the bracing bolt and sleeve. Depending on the area of application, the operating force limit is to be set more or less above the normal operating force. An insignificant degree of load alleviation and distance of the operating force limit to the operating force is selected for equipment with normally almost constant operating force and just a slight degree of tolerance. A higher operating force limit is selected accordingly for devices in which the operating force fluctuates within a specific degree of tolerance. Accordingly, the values for the given degree of load alleviation and the given degree of stress are also to be provided with a greater tolerance range.

BRIEF DESCRIPTION OF THE DRAWINGS

An embodiment of the invention is explained below with the help of an illustration. Seen in.

DETAILED DESCRIPTION

Figure 1:
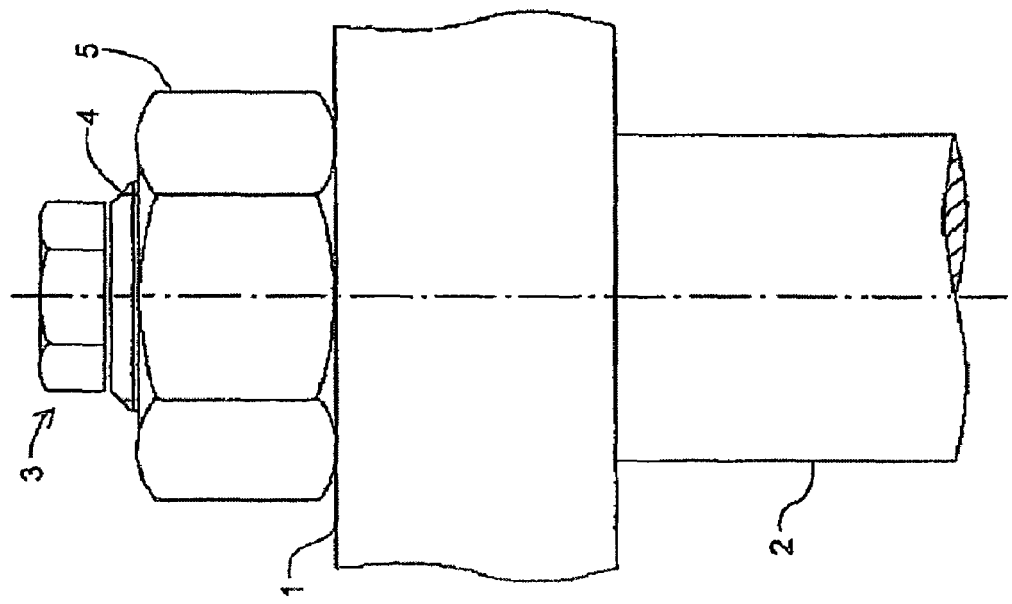
FIG. 1 is the lateral view of two elements connected with each other by means of a threaded connection.
Figure 2:
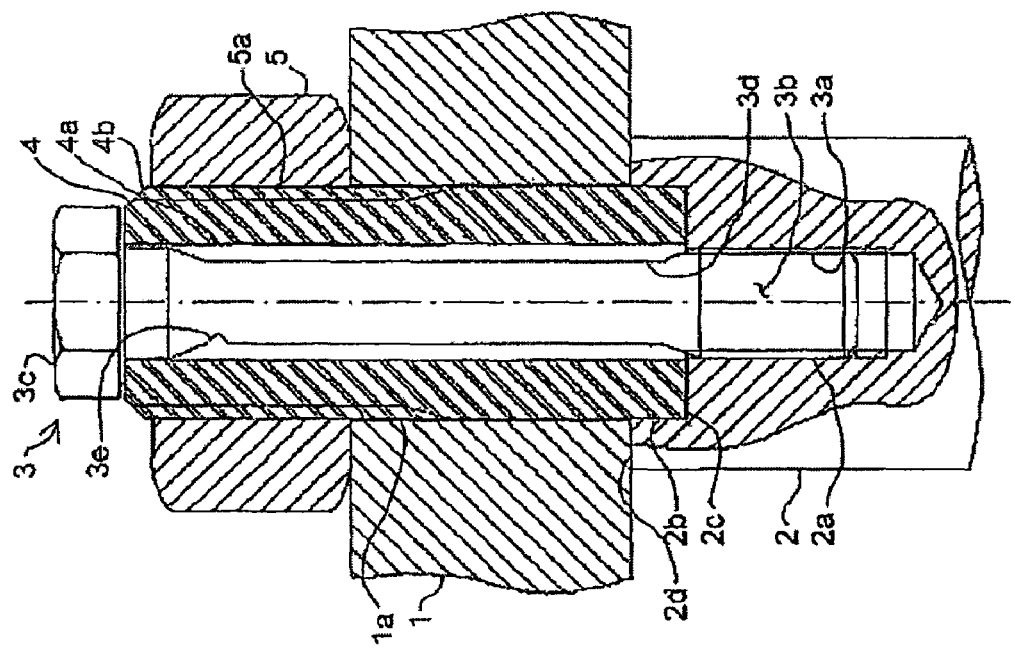
FIG. 2 is a lateral, local sectional view through this arrangement.

As can be seen in FIGS. 1 and 2, two elements 1, 2 to be connected are clamped together by means of a threaded connection. Both the elements 1, 2 to be connected are, for instance, a bar 1 and a beam 2 and are described below as such for easier differentiability.

The clamping arrangement of the bar 1 and the beam 2 essentially consists of a stud 3, which connects a sleeve 4 against the beam 2, and a tension nut 5, which sits on the sleeve 4 in thread engagement and is arranged against the beam 2 for clamping the bar 1.

Moreover, beam 2 exhibits a borehole with an inner thread 2a, [the borehole] leading from its surface 2d into this. The inner thread 2a is used to accommodate an outer thread 3a in the frontal area of a shank 3b of the stud 3. At the opposite end, stud 3 exhibits a grip head 3c in a normal manner, the outer diameter of which is greater than that of the shank 3b.

In the assembled arrangement, the shank 3b of the stud 3 passes through the sleeve bore 4a of the sleeve 4. With the help of the grip head 3c, the sleeve 4 is clamped against the surface 2c of the beam 2. For achieving better guiding stability, the region of surface 2c of the beam 2 for supporting the sleeve 4, as per the preferred embodiment, is recessed with respect to the other surface 2d of the beam in the form of a widened bore 2b.

Bar 1 exhibits a beam bore 1a, which is used for the passage of the sleeve 4. For clamping bar 1 with the beam 2, the sleeve 4 exhibits an outer thread 4b in at least its end section facing the grip head 3c, which, in the clamped status, is engaged with the tension nut 5. By screwing the tension nut 5 on to the sleeve 4, bar 1 is appropriately clamped against the beam 2. The outer diameter of the grip head 3c is advantageously dimensioned in such a manner that the tension nut 5 is guided across the grip head 3c, and can be screwed on to the sleeve 4.

The shank 3a of the stud 3 advantageously exhibits a tapering 3d in the region between the front outer thread 3a and the grip head 3c, which can, for example, also be used as the pre-determined breaking point region.

A feature of the arrangement to be highlighted is the ratio of the rigidity and/or of the elasticity of individual components to each other. These depend, in particular, on the properties of the materials and the geometry of the components.

The crucial factor here is that the stud 3 is more flexible, preferably clearly more elastic than the sleeve 4. In view of beam 2 and bar 1, essentially rigid materials as compared to those of sleeve 4 and the stud 3 are assumed. Here, the sleeve is, in particular, more flexible than the bar 1. With such an elasticity specification, a proportionately long change in path or elongation of the stud 3 is combined with a given change in force, while in comparison thereto, a relatively shorter change in path, in particular the compression of the sleeve 4, is combined with a comparatively greater change in force.

Figure 3:
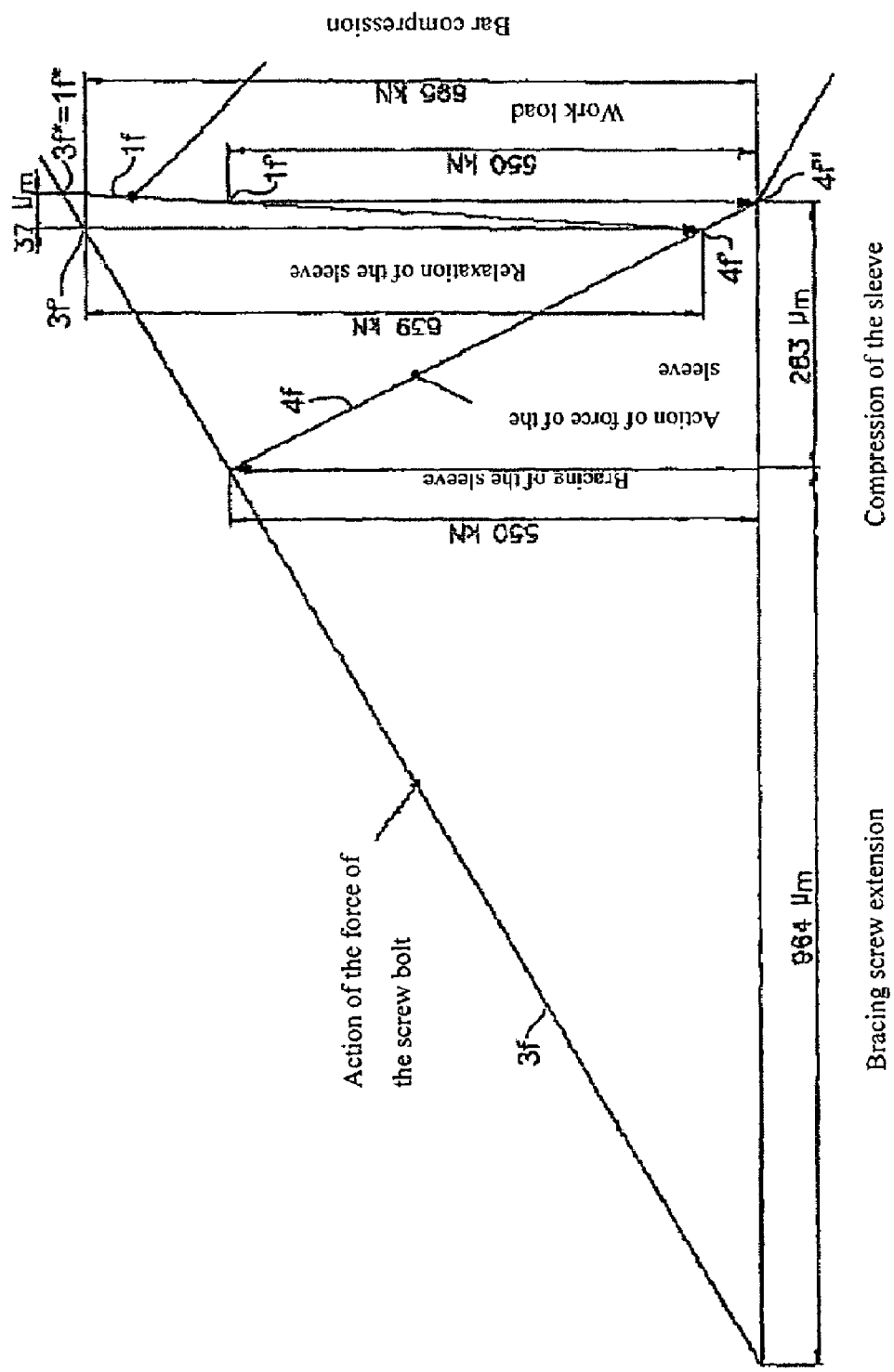
FIG. 3 is a force flow diagram for illustrating the elasticity and compressibility behavior of various individual elements of this device while clamping.

FIG. 3 describes the course of force and elongation/compression of individual components in the assembly and clamping of the bar 1 on the beam 2. The dimensions given in FIG. 3 are typical for use in metal powder presses, and only serve as an illustration. A transmission of the principle to completely different dimensional relations and measures is, in principle, possible. Sleeve 4 and beam 2 behave like a single part due to the high pre-stress of the individual parts.

In order to clamp bar 1 with beam 2, in the first step, in accordance with the partially preferred operation of a process, the sleeve 4 is clamped with the help of stud 3 to beam 2. In the example portrayed, the shank 3a is lengthened by approx. 964 µm for an initial load of approximately 550 kN, whereby the force flow ratio is characterized by the shallow running incline 3f. Preferably, shank 3a of the screw or of the stud 3 should be stressed to its elastic limit or its plastification point in this process, or if applicable, in the steps that follow.

In the next step, bar 1 is clamped against beam 2 with the help of the tension nut 5, which engages in the outer thread 4b of sleeve 4. The exemplary pre-stressing force is 639 kN. Through the pre-stressing, there is now a lengthening or a release of tension of the sleeve, which had been compressed together in the previous step. Whereas earlier the sleeve 4 had been compressed by 283 µm, the pre-stressing force of the tension nut 5 is selected in such a way that sleeve 4 is not totally relieved of tension. The graph of tension of sleeve 4 is shown by curve 4f, which, corresponding to the great rigidity compared to stud 3, is steeper than its curve 3f. After the clamping of tension nut 5, the sleeve 4 is subjected to a residual tension force of 56 kN in the illustrated example and is compressed, except for a remaining upsetting course of just 37 µm. During the release of tension on sleeve 4 the bracing bolt 3 is stretched further.

In the curve graphs an inner frictional connection is established at points 3f', 4f' between the grip head 3c of the stud 3, sleeve 4 and beam 2 on the one hand, and an outer frictional connection on the other hand to clamp the bar 1 on beam 2 between tension nut 5, sleeve 4, bar 1 and beam 2. The outer and inner frictional connections cause the stud 3 to be stressed under tensile stress, but do not carry any actual load. At the same time sleeve 4 is also released of tension except for a residual compression of 37 µm.

In this situation, beam 2 remains braced very firmly with sleeve 4, as long as sleeve 4 is not lifted off from beam 2 under the work load of bar 1. Only when the work load with which bar 1 is relatively pushed away from beam 2 is 550 kN, the pre-tensioning force of the sleeve 4 becomes zero, so that sleeve 4 is lifted off from beam 2 after further increase in the work load. At that moment, the bracing bolt or stud 3 bears the entire load. The increase in the work load from zero to 550 kN of bar 1 against beam 2 is represented by curve 1f for the bar compression. Corresponding to the greater rigidity of bar 1 compared to the rigidity of sleeve 4, this curve is even steeper than the curve 4f for sleeve 4. Thus, in the diagram, when the force of 550 kN is exerted by bar 1 against beam 2, it results in the total release of sleeve 4, which is indicated by the points 4f'', 1f' on the curve. This condition represents the theoretical breaking point, if the stud 3 were actually to be tensioned up to its elastic limit in the first step.

With further increase in the force acting on bar 1, the sleeve 4 is lifted off from beam 2, and the stud 3 is stretched further, leading to its break. The fracture torque is indicated by the points 1f*, 3f*. Based on a first exemplary calculation, the breaking strength of approximately 639 kN of stud 3 is reached already after further elongation of 0.005 mm after the release of sleeve 4. The deformation speed of the stud 3 after the raising of the sleeve 4, so that the force acting on stud 3 is—according to the portrayed example—(630–550) kN/0.005 mm=17,800 kN/mm=1,780 to/mm so that in reality this results in the immediate breaking of the stud 3 (sic). The safety mechanism embodied to protect against overload in this manner is thus primarily dependent on the geometry and internal and external forces, and not on the dispersion of the material parameters.

In the use of the bracing arrangement or the bracing method for screwing the two elements 1, 2 to be braced with each together, it is of advantage if a justification is done according to the application, in which context practical breaking tests are of relevance. After a break, it is necessary only to replace the broken stud 3, in order to carry out another break test. In later applications, a quick replacement of the stud 3 is also possible when the entire arrangement is exposed to the overload and results in a break of the stud 3.

In order to make the replacement of the stud 3 following a break as easy as possible, it is of advantage if a pre-determined breaking point 3e is provided near the grip head 3c, so that the stud 3 does not break near the screw thread area 3a, which would make the replacement unnecessarily more difficult.

If a larger number of bracing arrangements of this kind with a particular type of overall arrangement are to be provided, a one-time series of tests for determining the appropriate bracing relationships can be carried out, so that, based on the specific torque data, the bracing of the stud 3 and the sleeve 4 on beam 2 or the bracing of the tension nut 5 on the sleeve 4 for bracing the bar 1 against beam 2 is possible with the adjustment of the torque. Alternatively or in addition to this, use of power sensors, for instance of a power port, which can be used between the tension nut 5 and bar 1 is also possible.

The invention claimed is:

1. A bracing arrangement with overload protection comprising:
   a first element to be braced;
   a second element to be braced against the first element;
   a bracing bolt bracing the first and second elements, wherein said bracing bolt is strained to its yielding point;
   a sleeve, which is braced and compressed against the second element to be braced with the bracing bolt and which goes through the first element to be braced; and
   a sleeve tensioning device engaging the sleeve and bracing the first element against the second element, the sleeve tensioning device releasing the sleeve to a pre-specified extent, wherein increasing the operating force acting on the first and second elements beyond an operating force threshold relaxes the sleeve relative to the bracing by the bracing bolt and breaks the bracing bolt.

2. The bracing arrangement according to claim 1, in which the bracing bolt is a stud with a screw thread for screwing it into a bore with an internal thread of the second element to be braced.

3. The bracing arrangement according to claim 1, in which the sleeve has an external screw thread for screwing onto the sleeve tensioning element with an internal thread.

4. A bracing arrangement with overload protection comprising:
   a first element to be braced;
   a second element to be braced against the first element;
   a bracing bolt bracing the first and second elements, wherein said bracing bolt is strained to its yielding point;
   a sleeve, which is braced and compressed against the second element to be braced with the bracing bolt and which goes through the first element to be braced; and
   a sleeve tensioning device engaging the sleeve and bracing the first element against the second element, the sleeve tensioning device releasing the sleeve to a pre-specified extent, wherein increasing the operating force acting on the first and second elements beyond an operating force threshold relaxes the sleeve relative to the bracing by the bracing bolt and breaks the bracing bolt,
   wherein the bracing bolt is more elastic than the sleeve.

5. A bracing arrangement with overload protection comprising:
   a first element to be braced;
   a second element to be braced against the first element;
   a bracing bolt bracing the first and second elements, wherein said bracing bolt is strained to its yielding point;
   a sleeve, which is braced and compressed against the second element to be braced with the bracing bolt and which goes through the first element to be braced; and
   a sleeve tensioning device engaging the sleeve and bracing the first element against the second element, the sleeve tensioning device releasing the sleeve to a pre-specified extent, wherein increasing the operating force acting on the first and second elements beyond an operating force threshold relaxes the sleeve relative to the bracing by the bracing bolt and breaks the bracing bolt,
   wherein the sleeve is more elastic than the first element to be braced.

6. A method for bracing at least two elements to be braced with the help of a bracing bolt, a sleeve and a sleeve tensioning device comprising:
   bracing the sleeve by means of the bracing bolt against the second element to be braced, whereby the bracing bolt compresses the sleeve and the bracing bolt is strained to its yielding point,
   bracing the first element to be braced on the second element to be braced with the sleeve tensioning device, whereby the sleeve tensioning device is braced with engagement with the sleeve projecting through the first element to be braced, in such a manner that the sleeve is relaxed relative to the preceding compression up to a pre-specified extent of release,
   wherein an operating force acting on the first and the second elements leads, above a pre-specified threshold value, to a complete release of the sleeve and to the breaking of the bracing bolt.

* * * * *

UNITED STATES PATENT AND TRADEMARK OFFICE
CERTIFICATE OF CORRECTION

PATENT NO. : 7,748,936 B2
APPLICATION NO. : 10/549651
DATED : July 6, 2010
INVENTOR(S) : Schneider et al.

It is certified that error appears in the above-identified patent and that said Letters Patent is hereby corrected as shown below:

In Column 1, Line 63, please delete "though" and insert --through--, therefor.

In Column 1, Line 65, please delete "though" and insert --through--, therefor.

Signed and Sealed this

Twenty-first Day of December, 2010

David J. Kappos
*Director of the United States Patent and Trademark Office*